(12) United States Patent
Samson

(10) Patent No.: US 8,429,051 B1
(45) Date of Patent: Apr. 23, 2013

(54) INVESTMENT GUIDANCE SYSTEM WHICH ENABLES INDIVIDUALS TO RATE AND SELECT ASSETS BASED ON PERSONAL INVESTMENT PREFERENCES

(76) Inventor: Robert K. Samson, New York, NY (US)

( * ) Notice: Subject to any disclaimer, the term of this patent is extended or adjusted under 35 U.S.C. 154(b) by 3803 days.

(21) Appl. No.: 09/766,277

(22) Filed: Jan. 19, 2001

(51) Int. Cl.
*G06Q 40/00* (2012.01)
(52) U.S. Cl.
USPC ............ 705/36 R; 705/35; 705/37; 235/379
(58) Field of Classification Search ............... 705/36 R, 705/37, 35, 1; 235/379
See application file for complete search history.

(56) References Cited

U.S. PATENT DOCUMENTS

| | | | | |
|---|---|---|---|---|
| 5,053,758 | A | | 10/1991 | Cornett et al. ................ 340/712 |
| 5,126,936 | A | * | 6/1992 | Champion et al. .......... 705/36 R |
| 5,148,365 | A | | 9/1992 | Dembo ......................... 364/402 |
| 5,220,500 | A | | 6/1993 | Baird et al. ................... 364/408 |
| 5,321,833 | A | | 6/1994 | Chang et al. ................. 395/600 |
| 5,729,700 | A | * | 3/1998 | Melnikoff ................... 705/36 R |
| 5,784,696 | A | | 7/1998 | Melnikoff ...................... 705/36 |
| 5,794,178 | A | | 8/1998 | Caid et al. ......................... 704/9 |
| 5,799,298 | A | | 8/1998 | Bingham et al. ................. 707/1 |
| 5,819,238 | A | | 10/1998 | Fernholz ........................ 705/36 |
| 5,884,287 | A | | 3/1999 | Edesess ......................... 705/36 |
| 5,918,217 | A | | 6/1999 | Maggioncalda et al. ....... 705/36 |
| 5,999,918 | A | | 12/1999 | Williams et al. ............... 705/36 |
| 6,021,397 | A | * | 2/2000 | Jones et al. ................. 705/36 R |
| 6,029,195 | A | | 2/2000 | Herz et al. ..................... 709/219 |
| 6,275,814 | B1 | * | 8/2001 | Giansante et al. .......... 705/36 R |
| 6,338,047 | B1 | * | 1/2002 | Wallman .................... 705/36 R |
| 6,601,044 | B1 | * | 7/2003 | Wallman .................... 705/36 R |

OTHER PUBLICATIONS

Fabozzi, Frank J. and Fabozzi, T. Dessa. "The Handbook of Fixed Income Securities", Fourth Addition, 1995, pp. 90-96.
"Financial Engines" (http://www.financialengines.com), download date; Mar. 28, 2001.
Fund Evaluator$^{SM}$; Fidelity Investments. (http://fidelity.exodus.optigrab.com), download date; Mar. 28, 2001.
Lewis, Alan L. et al. "The Ibbotson-Sinquefield Simulation Made Easy." Journal of Business, vol. 53 (1980), pp. 205-214.
Rominger, Terry. "Investment Basics, Part I: Duration." CNBS Market Cast, May 1999, pp. 1-2.
Rominger, Terry. "Investment Basics, Part II: Modified Duration." CNBS Market Cast, Jun. 1999, pp. 3.

* cited by examiner

*Primary Examiner* — Daniel Felten
(74) *Attorney, Agent, or Firm* — Mintz, Levin, Cohn, Ferris, Glovsky and Popeo, P.C.

(57) ABSTRACT

An investment guidance system which enables individuals to rate and select assets based on personal investment preferences. The system comprises a method for receiving a request to rate a plurality of assets, providing two or more criteria associated with the assets for a user to evaluate, receiving a relative weight of importance for the two or more criteria, and determining a rating for each asset based on the relative weights assigned to the two or more criteria. The system then ranks the plurality of assets based on the rated value for each asset, provides a list of the ranked assets and receives requests to execute trades for the ranked assets. The assets can comprise mutual funds, stocks, bonds, and/or other investment vehicles.

13 Claims, 10 Drawing Sheets

Robert K. Samson

Returns 702

700

LARGE CAP

| Ticker 704 | Fund 706 | Trading 708 | Personal Ranking 710 | 1 Year | Total Returns 712 | | |
|---|---|---|---|---|---|---|---|
| | | | | | 3 Year | 5 Year | 10 Year |
| VFINX | Vanguard 500 Index | Buy/Sell | 1 | 17.92 | 27.37 | 26.7 | 18.71 |
| PIODX | Pioneer A | Buy | 2 | 16.63 | 27.37 | 24.41 | 16.75 |
| PREIX | T. Rowe Price Equity Index 500 | Buy | 3 | 17.57 | 27.06 | 26.39 | 18.44 |
| WVALX | Weitz Value | Buy/Sell | 4 | 9.69 | 27.18 | 26.16 | 18.19 |

FIG. 7A

Risk 703

701

LARGE CAP

| Ticker 704 | Fund 706 | Trading 708 | Personal Ranking 710 | Standard Deviation 713 | Sharpe Ratio 715 | Alpha For Best Fit Index 717 | R-Squared For Best Fit Index 718 |
|---|---|---|---|---|---|---|---|
| VFINX | Vanguard 500 Index | Buy/Sell | 1 | 21.93 | 1.13 | -0.05 | 100.0 |
| PIODX | Pioneer A | Buy | 2 | 20.74 | 1.21 | -1.29 | 96.0 |
| PREIX | T. Rowe Price Equity Index 500 | Buy | 3 | 21.86 | 1.12 | -0.29 | 100.0 |
| WVALX | Weitz Value | Buy/Sell | 4 | 18.3 | 1.36 | -6.98 | 59.0 |

FIG. 7B

Nine Model Portfolios

| Portfolio | 1 | 2 | 3 | 4 | 5 | 6 | 7 | 8 | 9 |
|---|---|---|---|---|---|---|---|---|---|
| Exp Return | 6.78% | 7.66% | 8.55% | 9.37% | 10.17% | 10.94% | 11.70% | 12.45% | 13.19% |
| Std Dev | 9.03% | 10.63% | 12.22% | 13.82% | 15.41% | 17.01% | 18.60% | 20.20% | 21.79% |
| Risk | Conservative | | | | | | | | Aggressive |

FIG. 9A

INVESTMENT GUIDANCE SYSTEM WHICH ENABLES INDIVIDUALS TO RATE AND SELECT ASSETS BASED ON PERSONAL INVESTMENT PREFERENCES

FIELD OF THE INVENTION

The invention is directed to a system and method for providing investment guidance and, more particularly, to a system for facilitating the selection of investment options such as mutual funds.

BACKGROUND OF THE INVENTION

With the advent of employee directed contribution plans such as 401(k) programs during the 1980's, many investors have ultimately become responsible for managing their own retirement investments. However, most individuals do not have the proper financial understanding to make well-informed investment decisions. Technical analysis of investments involves a thorough understanding of probability, statistics and risk assessment techniques. Furthermore, the types of retirement accounts (401(k), IRA, Roth IRA, etc.) and the possible investment options are continuously increasing in number, diversity and complexity. For example, while many investors today are very familiar with the concept of investing in a mutual fund as an ostensibly simple way to invest, there are now over 10,000 mutual funds to choose from.

Personal retirement assets currently exceed $4.5 trillion and are expected to reach nearly $9 trillion by 2004. Therefore, seeking to capitalize on the apparently vast market opportunity, many financial and software companies have developed investment software to assist individuals in evaluating their assets and in planning for retirement. Most investment software packages and applications found on the Internet provide the investor with asset allocation suggestions. The investor then determines the actual combination of financial products that satisfy the suggested allocation. Additionally, some programs employ "retirement calculators" to determine the probability of achieving a retirement income goal based on an anticipated retirement age, a savings amount, a desirable investment risk, and an asset allocation. In determining the probability of achieving a retirement income goal, these prior art retirement calculators essentially forecast the investors accumulated wealth as of the date at retirement. Thereafter, the calculators convert this lump sum amount to a fixed annuity which is purchased at the time of retirement.

Furthermore, some investment programs then create an optimized portfolio, comprised of the available financial products, that satisfies the investor's retirement goals and investment style. In analyzing the investor's goals and current investments, the prior art systems define a retirement investment strategy, determine a target asset mix, and identify a model portfolio for the user to implement.

Since most retirement assets are invested in mutual funds and since a vast amount of individuals prefer investing in mutual funds, a number of mutual funds selector programs are available in the prior art. Such mutual fund selection tools available in the prior art are designed to assist individuals in selecting mutual funds that meet certain criteria, such as, investment type, fund performance, fund ratings, fund risk, and fund loads. Typical mutual fund selectors allow individuals to eliminate mutual funds which do not meet a certain stated criteria. Specifically, based on the investor's understanding of the various statistical criteria, the investor sets thresholds, and the system filters the available universe of mutual funds eliminating those funds which do not meet the specified criteria. Once the universe of available funds is adequately reduced, the investor sorts the remaining funds one criteria at a time, and makes a subjective evaluation of the funds which meet all of the defined criteria.

SUMMARY OF THE INVENTION

In one aspect, the invention features an investment guidance system which enables individuals to rate and select assets based on personal investment preferences. The system comprises a method for receiving a request to rate a plurality of assets, providing two or more criteria associated with the assets for a user to evaluate, receiving a relative weight of importance for the two or more criteria, and determining a rating for each asset based on the relative weights assigned to the two or more criteria. The system then ranks the plurality of assets based on the rated value for each asset, provides a list of the ranked assets and receives requests to execute trades for the ranked assets. The assets can comprise mutual funds, stocks, bonds, and/or other investment vehicles.

In one embodiment, the criteria associated with the assets under evaluation include tax efficiency, consistent returns, stock/bond picking ability, low risk, consistent investment style, and low fees.

In a further embodiment, the system provides an input mechanism for receiving the relative weight of importance for the two or more asset criteria. The input mechanisms may include slider bars, text boxes, or other graphical input mechanisms.

In another aspect, the invention features an investment guidance system which provides financial planning assistance. The system comprises a method for receiving a financial goal from a user and receiving input decisions upon which the probability of achieving the financial goal is dependent, wherein one of the input decisions includes selecting an asset allocation based on investment risk. The system further comprises a method for determining the probability of achieving a financial goal and receiving an indication that the user has selected a target asset allocation investment plan in order to achieve the financial goal. Thereafter, the system receives a request to rate a plurality of assets within a selected asset class, provides criteria associated with the assets for a user to evaluate, and receives a relative weight of importance for each criteria based on the user's personal investment preferences. The system also determines a rating for each asset based on the relative weights assigned to the criteria and then ranks the plurality of assets based on the rating. Thereafter, the system receives a request to execute a trade for one or more of the ranked assets in order to fulfill the target asset allocation investment plan and executes the trade for one or more of the selected ranked assets.

In yet another aspect, the investment guidance system comprises a method for reallocating the asset allocation in a user's portfolio based on executed trades. Furthermore, the system also receives additional requests to execute trades for one or more of the ranked assets in order to fulfill the target asset allocation investment plan.

Additionally, through a monitoring system, the investment guidance system evaluates the target asset allocation investment plan against one or more financial goals and alerts the user if progress towards one or more of the financial goals deviates substantially.

In a preferred embodiment, the financial goal is a retirement income goal, and the input decisions which effect the probability of achieving the retirement income goal include, a 401(k) contribution rate, a taxable savings rate, the income required at retirement, and the anticipated retirement age.

In yet another aspect, determining the probability of achieving the financial goal involves utilizing a parametric lognormal model which incorporates a total time horizon. The total time horizon is the sum of the independently calculated time weighted horizons for the period of cash inflows and the period of cash outflows.

In yet another aspect, the invention features an investment guidance system which rates assets for Internet users. The system features a memory for storing asset information, a processor connected to the memory, a transmitter connected to the processor to enable the processor to transmit information to a user system by means of the Internet, and a receiver connected to the processor to allow the processor to receive information from the user system by means of the Internet. The processor receives a request to rate a plurality of assets, transmits criteria associated with the assets for a user to evaluate, and receives in connection with user processors, a relative weight of importance for each criteria based on the user's personal investment preferences. The processor also determines a rating for each asset based on the relative weights assigned to each criteria, ranks the plurality of assets based on the rating and provides a list of the ranked assets.

In yet another aspect, the invention features an investment guidance system for providing financial planning assistance to Internet users. The system features a memory for storing asset information, a processor connected to the memory, a transmitter connected to the processor to enable the processor to transmit information to a user system by means of the Internet, and a receiver connected to the processor to allow the processor to receive information from the user system by means of the Internet. The processor receives a financial goal from a user and also receives one or more input decisions upon which the probability of achieving the financial goal is dependent, wherein one of the input decisions includes selecting an asset allocation based on investment risk. The processor also determines the probability of achieving the financial goal and receives an indication that the user has selected a target asset allocation investment plan in order to achieve the financial goal.

Thereafter, the processor receives a request to rate a plurality of assets within a selected asset class, provides criteria associated with the assets for a user to evaluate, and receives a relative weight of importance for each criteria based on the user's personal investment preferences. The processor also determines a rating for each asset based on the relative weights assigned to the criteria, and then ranks the plurality of assets based on the rating. Further, the processor receives a request to execute a trade for one or more of the ranked assets in order to fulfill a target asset allocation investment plan, and executes the trade for one or more of the selected ranked assets.

While the embodiments of the present invention will be described with reference to a financial guidance system and more specifically to a method and system for evaluating mutual funds based on personal investment preferences, the method and apparatus described herein are equally applicable to the evaluation and ranking of other types of data, financial or non-financial (e.g., such as wine characteristics used to rank wine) based on personal preferences.

BRIEF DESCRIPTION OF DRAWINGS

FIGS. 7A and 7B illustrate two views of an exemplary fund rank table according to one embodiment of the present invention.

FIGS. 9A, 9B, and 9C illustrate figures associated with the goal forecaster methodology including the expected returns and standard deviations for nine model portfolios, the normal versus lognormal distributions for exemplary portfolio number 7, and the lognormal distributions for portfolio seven over various time horizons.

DETAILED DESCRIPTION OF THE PREFERRED EMBODIMENTS

Overall System

Figure 1:
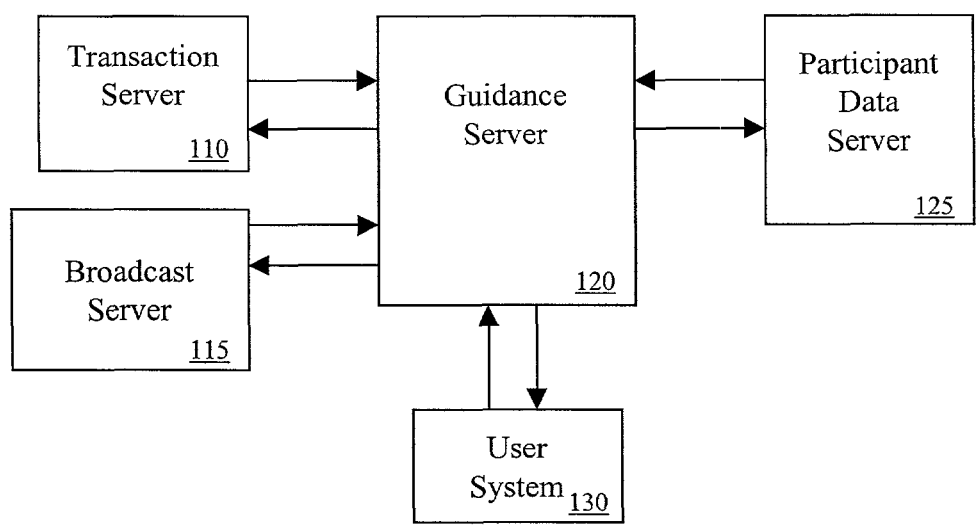
FIG. 1 is a block diagram illustrating a system in accordance with one embodiment of the invention.

FIG. 1 illustrates the system architecture of the investment guidance system 100 which enables investors to determine long-term financial goals, select an optimized asset mix, select mutual funds from a pre-set universe based on personal investment preferences, execute mutual fund trades, receive information alerts when needed and evaluate and adjust investments on an ongoing basis. The system facilitates the selection of mutual funds by allowing the investor to apply relative weights of importance to mutual fund criteria rather than requiring the investor to set fixed statistical thresholds. The system then sorts the available funds taking into account all of the weighted mutual fund criteria and presents the user with a set of ranked funds. According to the embodiment depicted in FIG. 1, the investment guidance system 100 includes a guidance server 120, a transaction server 110, a broadcast server 115, a participant data server 125, and a user system 130.

The guidance server 120 is the primary provider of investment planning assistance to users, and is the central database repository for storing user profile and investment data. In this manner, ongoing investment monitoring may be performed and alerts may be triggered. The guidance server 120 and its function will be described in further detail below, in connection with FIG. 3.

Users may include 401(k) participants, retirement plan participants, and retail users of financial service providers. The user system 130 may employ a general-purpose computer for communicating with the guidance server 120. In one embodiment, the general purpose computer of the user system is comprised of a processing unit, a modem, memory means, and any software required to communicate with the guidance server.

In a further embodiment, the user system 130 may interact with and receive feedback from the investment guidance system 100 using a financial provider's software which may be running within a browser application. The financial provider software communicates with the guidance server 120 which acts as a HTTP server. In this embodiment, the investment guidance system 100 increases online traffic and encourages return visits to the financial provider's website.

The transaction server 110 may be located at the site of a brokerage firm, wherein it accepts and executes securities transactions which are initiated by the user and transmitted via the guidance server 120. The transaction server 110 may also communicate with various stock exchange servers to effect such transactions. As will be apparent to those skilled in the art, there are a number of ways that trades can be transmitted electronically for execution in a securities, commodities, or other exchanges.

The broadcast server 115 is a database server. Accordingly, it runs an instance of a Relational Database Management System (RDBMS), such as Microsoft SQL-Server™, Oracle™ or the like. The broadcast server 115 provides access to all fund information and analytical data. The data is received from vendors at a predetermined time interval, usually on a monthly basis. The broadcast server 115 can also convert the data obtained from data vendors from the specific vendor's format into a standard format that can be used throughout the investment guidance system.

The participant data server 125, which is a component of the partnering financial provider's system, may store user data which is then transmitted to the guidance server 120. If the financial provider manages the user's 401(k) account and/or personal investment accounts then the participant data server 125 contains the user's personal and financial information. Users may communicate directly with the guidance server 120 in order to provide their personal and financial information or the users may contact the partnering financial provider who will then transmit user information stored in the participant data server 125 to the guidance server 120. In a further embodiment, the guidance server 120 can automatically retrieve user information from the participant data server 125 based on a user's request. In addition to personal information, user assets and IRA rollovers are usually stored in the participant data server 125.

In utilizing the investment guidance system 100, the financial provider can guide users through the investment process, including assisting with mutual fund selection, while avoiding specific recommendations and fiduciary issues associated with giving "advice." The guidance server 120 provides a vehicle for the financial provider to enhance customer relations, increase assets under management and improve account retention.

An Exemplary Computer System

Figure 2:
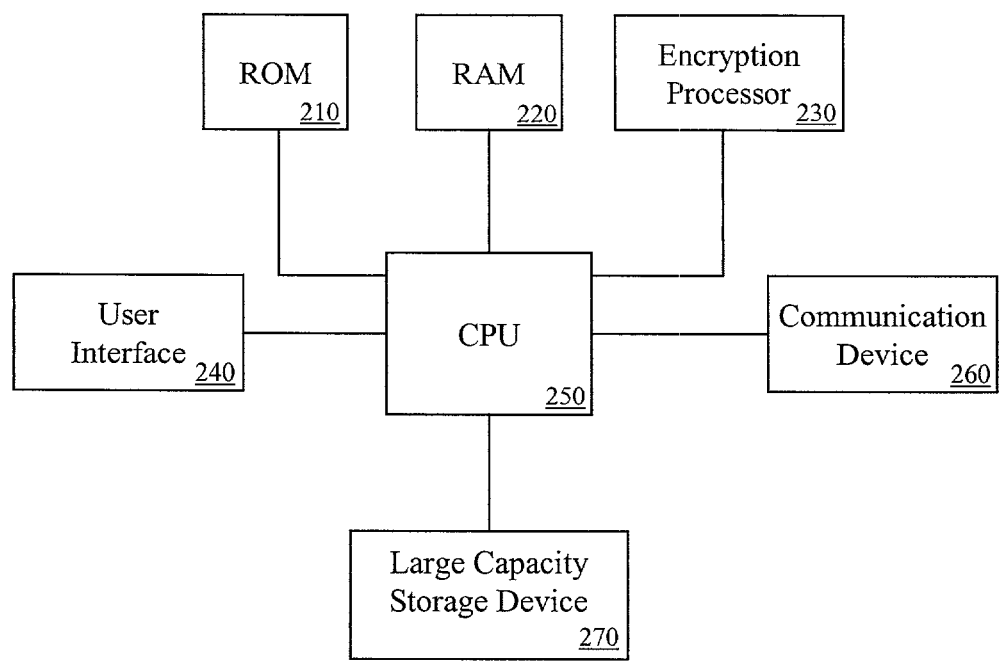
FIG. 2 is a block diagram showing further details of an exemplary system that can be used as one or more of the components shown in FIG. 1.

FIG. 2 depicts an example computer system capable of carrying out the functionality of the investment guidance system in FIG. 1. The computer system may represent an exemplary user system or any one of the plurality of servers referenced in FIG. 1. The system includes a central processing unit ("CPU") 250, read-only memory ("ROM") 210, random access memory ("RAM") 220, an encryption processor 230, a communication device 260, user interface 240 and a large capacity storage device 270. The large capacity storage device 270 may include hard disk magnetic or optical storage units, as well as CD-ROM drives or flash memory.

The CPU 250 executes program code stored in one or more of the ROM 210, RAM 220 and/or large capacity storage device 270 according to conventional data processing techniques to carry out the functions and acts described in connection with the investment guidance system. The CPU 250 preferably comprises at least one high-speed digital data processor adequate to execute program modules for determining the probability of reaching a financial goal, developing a retirement and investment plan and evaluating mutual fund selection criteria. The CPU 250 may be embodied as a single commercially available processor or as a number of processors operating in parallel.

CPU 250 comprises, in one embodiment, a microprocessor such as an Intel® Pentium Processor, which is electronically coupled to each of the central controller's other elements (e.g., RAM 220, ROM 210, etc.).

The ROM 210 and/or storage device are operable to store one or more instructions, while the CPU 250 is operable to retrieve, interpret and execute those instructions. In one embodiment, the CPU 250 includes a control unit, an arithmetic logic unit (ALU) and a CPU local memory storage device. The control unit is able to retrieve instructions from the data storage device or ROM 250 while the ALU is able to perform operations needed to carry out instructions. The CPU local memory storage device is capable of providing high-speed storage used for storing temporary results and control information.

The encryption processor 230 facilitates the public and private key interchange for all secured transactions between all elements of the investment guidance system. The private nature of the information that is electronically transferred between guidance server 120, transaction server 110, broadcast server 115, participant data server 125 and the user system 130 indicates that secure platforms are preferable to guarantee the privacy of the information for all entities involved.

Secure platforms may be established between all elements of the investment guidance system through an encrypted pipe or a dedicated encrypted line. In a further embodiment, the encryption process may be demonstrated in a way where a Certification Authority, such as VeriSign, first issues Server IDs, or digital certificates to credible organizations. All organizations must complete a thorough background check to ensure the organization is what it claims to be (and is not claiming a false identity) before receiving a server ID.

Based on Secure Sockets Layer (SSL) technology, a secure communication channel is established between the guidance server 120 and the user system 130 as well as between the guidance server 120 and the transaction server 110, the broadcast server 115, and the participant data server 125. In one embodiment, SSL encrypts all traffic between the guidance server 120 and user system 130, using a unique session key. To securely transmit the session key to a user system 130, the guidance server 120 encrypts it with the assigned public key. Each session key is used only once, during a single session with a single user. These layers of privacy protection ensure that information cannot be viewed if intercepted by unauthorized parties.

When a message is sent electronically, the sending and receiving computers each generate a code based on the contents of the message. If even a single character in the message content is altered during transmission, the receiving computer will generate a different code, and then alert the recipient that the message is not legitimate. All pages that require secure transactions are switched to a Secure Sockets Layer.

A communication device 260 comprises devices for allowing communication between the servers and the user system as well as communication between the guidance server 120 and the financial provider. Communication is preferably electronic by means of the Internet. The communication device 260 may include a conventional high speed modem, a network interface card, or other well known interface devices, such as those used for coupling to an Ethernet, token ring, or other types of networks. In this manner, the computer system may be coupled to a number of servers via a conventional network infrastructure, such as the Internet and/or a company's Intranet. In one embodiment, the communication device 260 comprises a receiver to receive requests from the Internet and a transmitter to transmit information to the Internet.

A user interface 240 can comprise a display device, such as a cathode ray tube (CRT) or a liquid crystal display (LCD), for displaying information to a computer user. For example, graphical illustrations of current and "target" asset allocations, charts illustrating lifetime wealth forecasts and risk assessment, and other data may be presented to the user on the display device. Additionally, user interface 240 also comprises an alphanumeric input device and a cursor control, such as a mouse, a trackball, or cursor direction keys for communicating directional information to the CPU. For purposes of the preferred embodiment, it is assumed that a display is used to present information to each user, but it should be understood that information may be presented to the users using an audio signal, a Braille interface or any other suitable user interface.

An Exemplary Guidance Server

Figure 3:
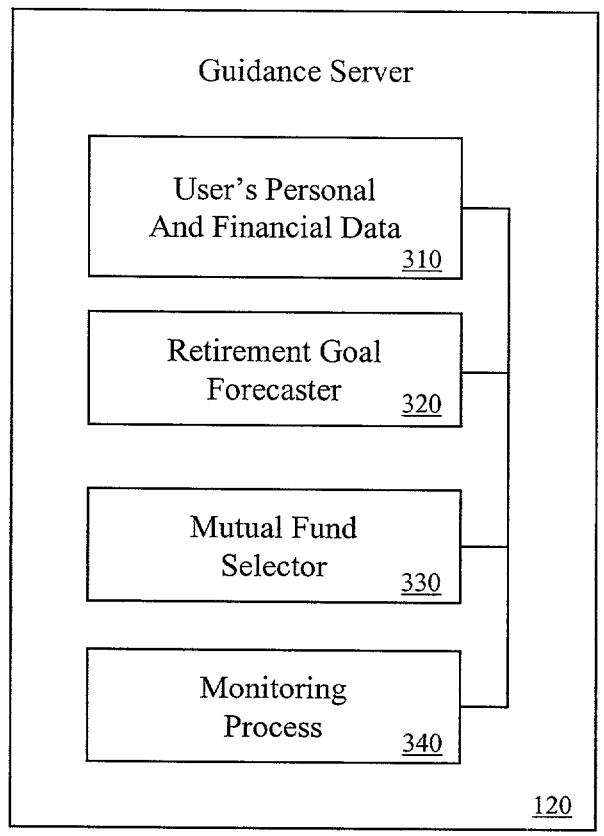
FIG. 3 illustrates an exemplary guidance server of the system shown in FIG. 1.

FIG. 3 illustrates an exemplary guidance server 120 and the elements stored and processed by the server in order to develop and execute a retirement and investment plan, and, more importantly, to provide a vehicle wherein users can rank and select mutual funds from a pre-set universe based on personal investment preferences. The elements within the guidance server include a user's personal and financial data 310, a retirement goal forecaster 320, a mutual fund selector 330, and a monitoring process 340.

A user's personal and financial information is either directly inputted by the user or it is imported from a partnering financial provider. The partnering financial provider may manage the user's 401(k) account and/or personal investment accounts. If the user is directly providing his/her personal and financial information to the guidance server, the user will be prompted by a series of information worksheets to enter necessary data. The user's financial data will be utilized by the retirement goal forecaster 320, the mutual fund selector 330, and the monitoring process 340 modules. Financial information the user may be asked to provide includes current age, gender, current wages, expected wage growth, account balances, current financial product holdings, savings rate, retirement income goals, available financial products, constraints on fund holdings, rate of inflation, and other income sources such as pension, social security benefits, or anticipated inheritances. Users 130 may provide information for themselves, their spouse or any other member of their household.

To ensure accurate investment planning, the user must continuously update data that is used by the investment guidance system 100 in projecting retirement goals. For example, if the user's household income increases or the user's employer adds a new mutual fund to the 401(k) program, then the user should update the income information and the list of available financial products in the user profile section.

Additionally, the user 130 may also provide investment information to the guidance server 120. For each investment holding, such as a 401(k) account, the user will either (a) type in the ticker symbol of the security they own (mutual fund or individual security), or (b) use a look-up feature provided by the investment guidance system 100 wherein they can type in the company or fund name, and whereby the investment guidance system looks up the corresponding ticker. In one embodiment, based on the ticker, the corresponding asset class will be assigned by the investment guidance system 100 by accessing the broadcast server 115. In an alternative embodiment, the user can add a generic asset, by specifying the asset classification and the dollar amount. After providing the ticker, the user may be asked to provide the number of shares owned, the purchase date, and the cost basis. Asset classes include, but are not limited to U.S. equities (or any sub-asset class thereof, such as large cap value, mid cap value, mid cap growth, small cap value, small cap growth), international equities (or any sub-asset class thereof, such as emerging market equities), fixed income (or any sub-asset class thereof, such as intermediate-term bonds or junk bonds), real estate, precious metals and cash. In one embodiment, only the broad asset class definitions may be used (e.g., U.S. equities, international equities, etc.), and in a further embodiment, the sub-asset classes are used to allocate the user's assets (e.g. large cap, small cap, emerging market equities, etc.).

The retirement goal forecaster 320 determines and graphically depicts the current asset allocation. The current allocation is based on the aggregate securities classification and the amounts across all of the accounts. Based on the user's current holdings, the investment guidance system 100 may forecast the likelihood of meeting a retirement goal and graphically depict the current portfolio's projected growth over time. The retirement goal forecaster 320 provides the user with statistics regarding the likelihood that they will be able to retire at the specified retirement age, given the time horizon, calculated returns, and standard deviations, which are based on the user's current portfolio. Additionally, the retirement goal forecaster 320 enables users to modify their current savings rate, anticipated retirement age, income required at retirement and investment risk in order to define long-term goals and achieve a feasible investment plan. The user defines his/her risk tolerance by selecting one of the multiple predefined asset allocations ranging from conservative to aggressive. The retirement goal forecaster 320, its function and exemplary user interface will be discussed in further detail in connection with FIG. 4.

Once the user determines an optimized asset mix through the retirement goal forecaster, the target asset allocation is selected for implementation; that is, the user is ready to select mutual funds to fulfill the target asset allocation investment plan. The objectives of the mutual fund selector 320 are to assist users in (a) ranking mutual funds in each asset category based on personal investment preferences and (b) selecting mutual funds to buy and sell in the appropriate quantities so that the current asset allocation meets the target allocation. The mutual fund selector, its function and exemplary user interface will be discussed in further detail below in connection with FIGS. 5 through 8.

In one embodiment, the investment guidance system continuously monitors and alerts users on the status of their retirement and investments through a monitoring process 340. The system may evaluate the user's investment plan against one or more financial goals and may notify the user if progress towards any of the goals has deviated substantially. Circumstances which may trigger an alert, include, but are not limited to, (1) no longer being on-target for meeting the retirement income goal, (2) no longer meeting the target asset allocation, (3) the fund slipping in rank as determined by reapplying the users investment preferences to new mutual fund data, and (4) news information concerning the user's mutual funds or other topical stories of interest.

The investment guidance system 100 evaluates the status of the user's target investment plan as new mutual fund data arrives. In one embodiment of the system, the user can select which monitoring and alerting options to choose from, such as retirement plan monitoring, asset allocation monitoring and mutual fund monitoring. The alerts can be generated by the investment guidance system 100 and presented to the user when he/she logs on to the system.

Alternatively, alerts may be generated proactively by the system and transmitted to the user via a telephone, e-mail, fax or standard mail messaging system. In one embodiment, if the alerts are transmitted by e-mail, the alert messages should include hyperlinks to the investment guidance system or to a news story if it is a news alert. Based upon the alerts generated by the monitoring system, the user may modify the retirement age, savings amount, income required at retirement and asset allocation until the user is satisfied with the probability of meeting his/her goal.

Retirement Goal Forecaster

Figure 4:
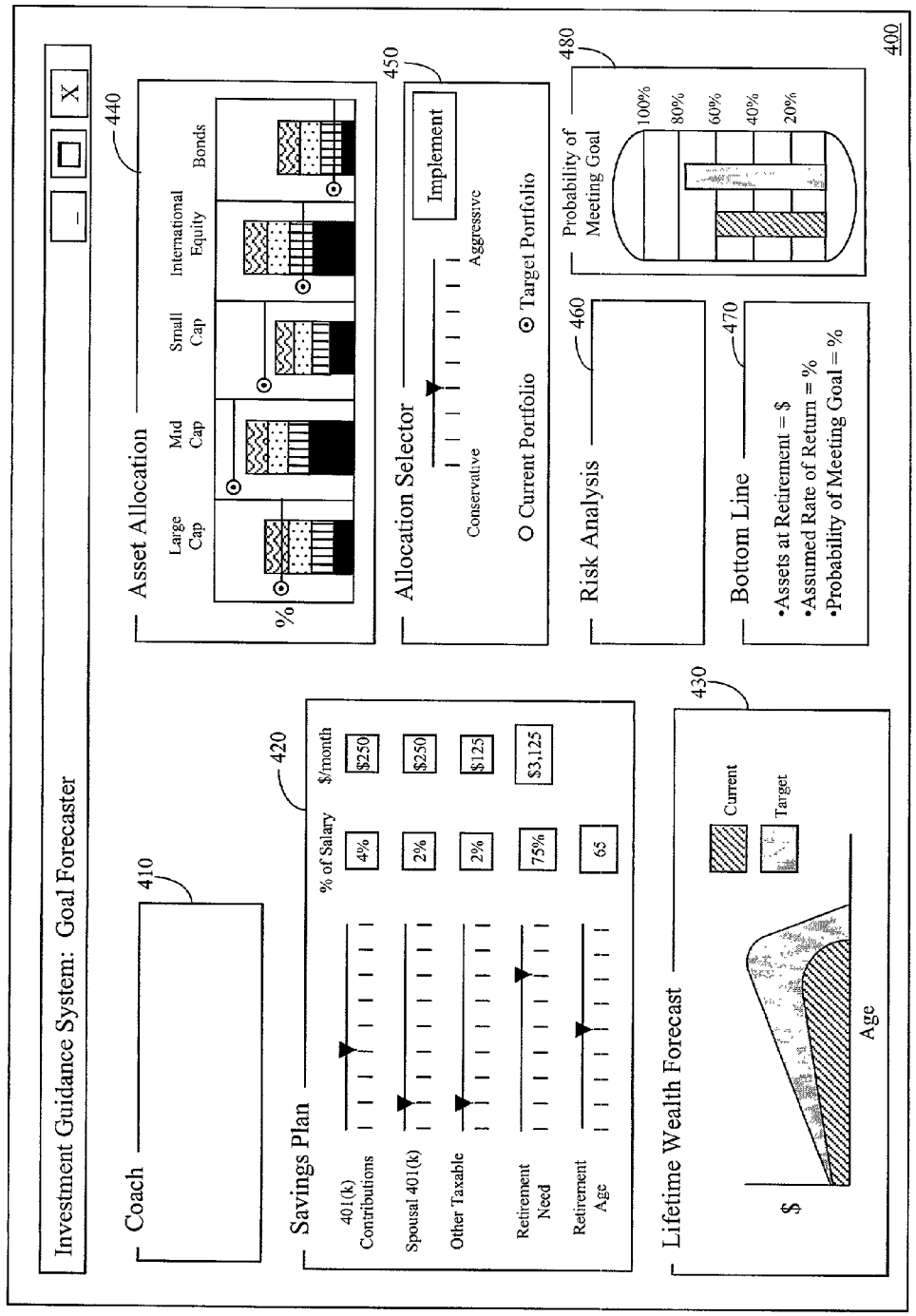
FIG. 4 illustrates a retirement goal forecaster summary screen according to one embodiment of the present invention.

FIG. 4 illustrates a retirement goal forecaster 400 summary screen according to one embodiment of the present invention. According to the embodiment depicted, the goal forecaster 400 summary screen includes seven separate areas: (1) an area 410 to display "coaching" messages to assist the user in developing a retirement and investment plan; (2) an area 420 for the user to modify savings amounts, anticipated retirement age, and retirement need (i.e., the income required at retirement); (3) an area 430 for graphically depicting both the current and target portfolio lifetime wealth forecast; (4) an area 440 for graphically depicting both the current and target asset allocation; (5) an area 450 to select various asset allocations varying from conservative to aggressive; (6) an area 460 for graphically depicting the risk associated with the target asset allocation; (7) an area 470 for illustrating the output values (also referred to as the "bottom line"); and, (8) an area 480 to graphically illustrate the probability of meeting the retirement income goal through a visual indicator.

Area 410 illustrates step-by-step procedures to guide the user in utilizing the goal forecaster summary and input screen to develop a retirement plan and select a target asset allocation investment plan.

Area 420 initially illustrates the current savings information that was provided by the user during the first user session. However, the user may modify these variables to effectively determine how best to achieve a retirement goal. These variables are manipulated using graphical input mechanisms or they can be manually entered using alphanumeric characters. In one embodiment, depicted in area 420, slider bars are used as the graphical input mechanisms. If values are entered into any of the text boxes associated with the slider bars, then the sliders will update to reflect the manually entered number. The savings plans include, but are not limited to, 401(k) contributions, spousal 401(k) contributions, taxable plans and tax deferred plans. Additionally, the user can vary the income required at retirement (retirement need), which is usually 75% of the household income before retirement. The anticipated retirement age is also entered by the user in area 420 using a graphical input mechanism or alphanumeric characters. In the embodiment depicted, the retirement age is entered via a slider bar or a text box.

Area 430 illustrates a lifetime wealth forecast chart which graphically illustrates the customer's total assets over time. The change in assets is based on the net cash flow for the year and the selected asset allocation's rate of return. The beginning point is the current year and the ending point is the year of death.

Area 440 visually illustrates the current asset allocation as a percentage of the total current investments. In one embodiment, the current allocation is illustrated as a solid bar with different shadings for each account and the "target" asset allocation is depicted with a line and a target symbol. There are various methods to graphically depict both the current and target asset allocations including but not limited to, pie charts, line graphs, bar graphs and 3-D graphs. It is apparent to those skilled in the art that any graphical method can be employed. The asset classes illustrated in area 440 are large cap, mid cap, small cap, international equities and bonds. However, the illustrated asset allocations are exemplary only and additional asset classes can be specified by the partner financial provider or by the user.

Area 450 illustrates the graphical input mechanism for selecting one of the multiple asset allocation portfolios based on investment risk. In one embodiment, the allocation selector is a slider bar which allows the user to select from among a predetermined amount of alternate asset allocations portfolios ranging from conservative to aggressive. As the user manipulates the slider bar, to the various alternative asset allocations, the line and target symbol in area 440 will adjust accordingly. Additionally, the lifetime wealth forecast chart 430, the risk assessment chart and the bottom line will also be modified accordingly to reflect the new investment allocation and its forecasted rate of return. Area 450 also allows the user to toggle back and forth from evaluating their plan relative to the current asset allocation or one of the alternative asset allocations by selecting one of the radio buttons depicted.

The range of asset allocations describe an efficient frontier, providing the highest level of expected return based on a given level of risk, as measured by standard deviation. The asset allocation portfolios are generally derived through mean-variance optimization, which takes into account the capital market assumptions for each asset class, including the expected return, the standard deviation, and the correlation of the asset class with each of the other asset classes. Accordingly, capital market assumptions are used both to develop optimal asset allocations (through mean-variance optimization) and to forecast the performance of a given asset allocation.

Area 460 illustrates the risk analysis associated with the currently selected asset allocation. In one embodiment, the risk assessment can be graphically depicted by a pie chart, line graph, bar graph or a 3-D graph. The Risk Analysis chart depicts the risk or the range or potential outcomes when investing capital in a selected asset allocation over a predefined time horizon, usually 20 years. Alternatively, risk can be depicted either in terms of the projected variability of wealth (or returns) over time.

Based upon the retirement age, savings amount, retirement need and asset allocation, the investment guidance system provides the user with statistics regarding the possibility that he/she may be able to retire at an anticipated retirement age. In one embodiment, the "bottom line" illustrated in area 470 includes the assets at retirement, the assumed rate of return, and the probability of meeting the goal to retire at the anticipated retirement age. The bottom line may also include the age at which the investor's assets are exhausted. In one embodiment, the bottom line illustrates output values for both the current and target asset allocation plans. The methodology used by the investment guidance system in forecasting the likelihood of meeting a retirement goal will be discussed below.

According to one embodiment, area 480 graphically illustrates the probability of meeting a retirement income goal through a visual device. In the embodiment depicted, the graphical device comprises of a "metering" apparatus whose scale is in percentages and whose indicator changes heights accordingly. The metering device may illustrate the probability of meeting a financial goal for both the current and target asset allocations. In this example, the probability of meeting the financial goal is 60% and 78% for the current and target asset allocation plans, respectively. In alternative embodiments, the indication of the probability of meeting a financial goal may be conveyed by other graphical devices such as dials, charts, icons, or simply by a number and accompanying text. In one embodiment, if icons are used to communicate the likelihood of meeting a financial goal, a one to one correspondence may be established between various levels of probability and the icons that are used to represent the various levels of probability.

In this example, the financial goal represents a retirement income goal. It should be appreciated, however, that various other financial goals may also be represented such as savings goals and other intermediate goals, for example, saving for a down payment for a home or car, paying for a wedding, or financing a child's college education.

Based upon the initial diagnosis for the current asset allocation and savings amount illustrated in area 470 and graphically depicted in area 480, the user may choose to alter one or more parameters which drive the retirement planning process. Thus begins an iterative process whereby the user alters his/her savings rate, retirement income need, anticipated retirement age and asset allocation and has the investment guidance system evaluate the assets at retirement, the assumed rate of return, the risk assessment, the wealth forecast and the probability of meeting the goal to retire at an anticipated age with a defined retirement income. This iterative process continues until the user has selected an appropriate plan that satisfies his/her investment style, risk profile and probability forecast. Once the user has finalized his/her contribution levels and selected an optimal asset allocation, he/she is ready to select mutual funds to fulfill the "target" asset allocation plan.

It should be appreciated that the visual indicator in area 480 changes in real time as the user manipulates and alters the various input mechanisms such as slider bars which indicate user input decisions.

The interactive retirement goal forecaster is designed to return results in real time and alert users to a potential shortfall in savings. Additionally, the retirement goal forecaster enables customers to clarify long-term financial goals, determine a personalized risk profile, calculate the need for a higher/lower contribution level and set an optimized asset allocation mix.

Figure 5:
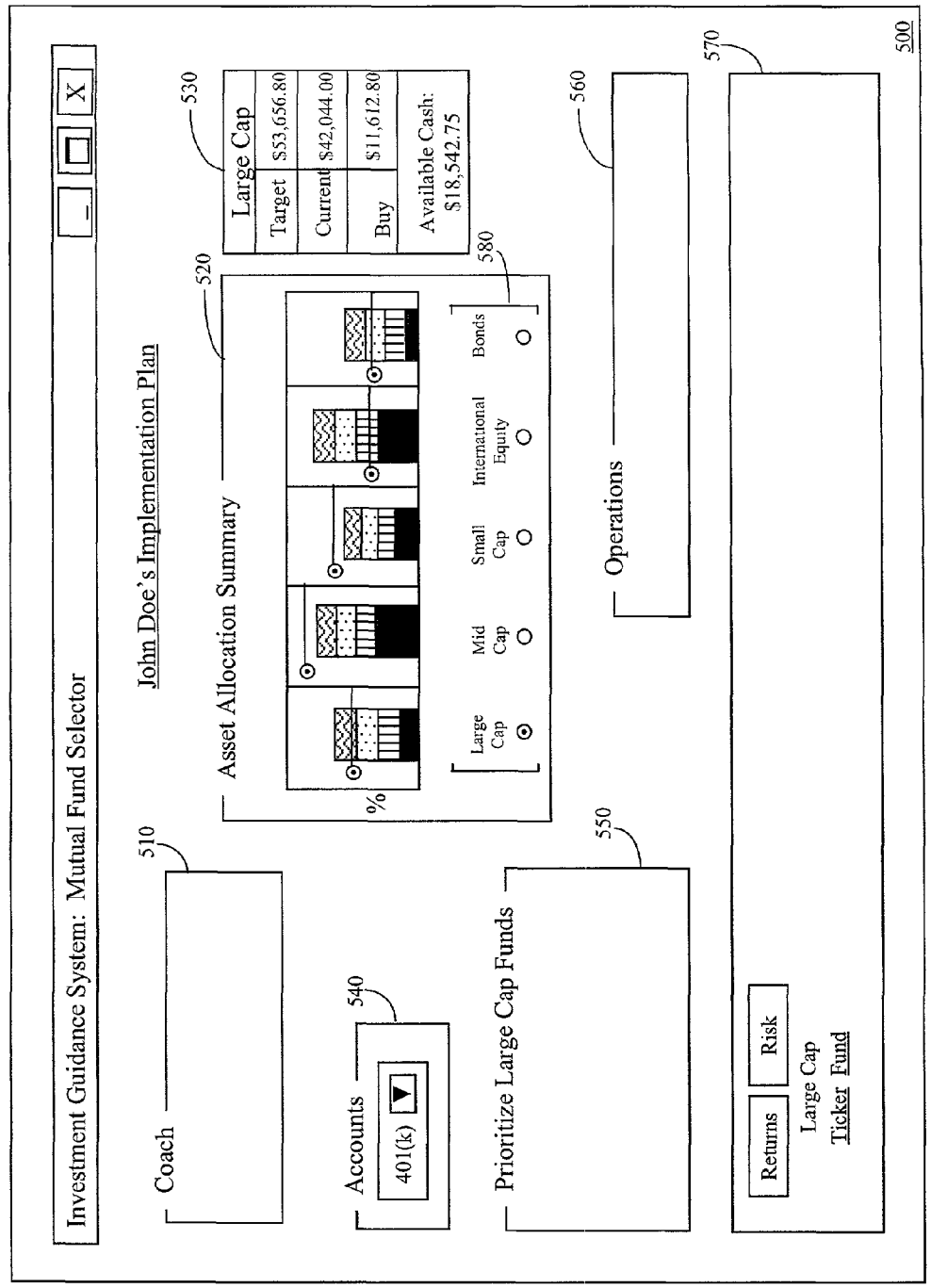
FIG. 5 illustrates a mutual fund selector summary screen according to one embodiment of the present invention.

According to one embodiment of the investment guidance system, the user is prompted to select the "Implementation" button in area 450 of FIG. 4, which brings the user to the mutual fund selection screen illustrated in FIG. 5. The finalized asset allocation is recorded as the target asset allocation and all of the input data, including modifications to the savings rate and retirement age, which are affected by moving the slider bars are then saved for the next user session.

It should be noted that the functions described in conjunction with the retirement goal forecaster could be carried out in different portions of the sample screen or by additional components that are currently not illustrated.

Goal Forecaster Methodology

The retirement goal forecaster utilizes probabilistic forecasting and capital marketing assumptions to determine the likelihood of meeting a retirement goal. Specifically, the goal forecaster utilizes a lognormal model to forecast both compound rates of return and ending period wealth values. Additionally, the goal forecaster analyzes the investors accumulated wealth up to retirement through a series of cash inflows (pre-retirement savings period) and also after retirement through a series of cash outflows (post-retirement spending period). Therefore, the goal forecaster assists users in planning through retirement up until an average life expectancy.

In 1977, Ibbotson and Sinquefield used a Monte Carlo simulation to forecast the behavior of the capital markets. The Monte Carlo simulation was based on the random drawing of actual historical datasets. In 1980, other researchers determined that the Ibbotson and Sinquefield's forecast could be closely replicated by a lognormal distribution with parameters derived from summary statistics, including the arithmetic mean return, standard deviation correlation coefficients and the investment time horizon. This so-called parametric approach was adopted by Ibbotson and Sinquefield in 1982 to produce probabilistic forecasts and has since been incorporated in the software products offered by Ibbotson Associates to investment professionals.

The lognormal model is used to forecast both compound rates of return and ending period wealth values. The model assumes that the returns measured from one time period to the next are statistically independent (i.e., no serial correlation). The first step is to calculate the expected value (m) and the standard deviation (s) of the natural logarithm of the portfolio's expected return. These values are derived through the expected return ($\mu$) and the standard deviation ($\sigma$) of the asset allocation as follows:

$$m = \ln(1+\mu) - \left(\frac{s^2}{2}\right) \quad \text{(EQ \#1)}$$

$$s = \sqrt{\ln\left(1 + \left(\frac{\sigma}{1+\mu}\right)^2\right)} \quad \text{(EQ \#2)}$$

In order to calculate a percentile of wealth or return for a given time horizon, the z-score is used to convert the percentile ranking into an expression describing the number of standard deviations from the mean. For example, the $95^{th}$ percentile is 1.645 standard deviations from the mean. The logarithmic calculations (m and s), time horizon (n) and the z-score of a percentile (z) are used to calculate cumulative wealth ($W^c$) and the compound rate of return ($R^c$) as follows:

$$W^c = e^{(mn+zs\sqrt{n})} \quad \text{(EQ \#3)}$$

$$R^c = e^{\left(m+\left(\frac{s}{\sqrt{n}}\right)\right)} - 1 \quad \text{(EQ \#4)}$$

The investment guidance system utilizes the above described parametric lognormal approach to probabilistic forecasting in determining the likelihood of meeting the retirement goal.

As previously discussed, capital market assumptions are used both to develop optimal asset allocations and to forecast the performance of a given asset allocation. In one embodiment, illustrated in FIG. 9A, the retirement goal forecaster 320 may include nine model asset allocation portfolios, ranging from conservative to aggressive, which the user selects in area 450 of FIG. 4. The asset classes for the model portfolios illustrated in FIG. 9A, include U.S. equities, U.S. fixed income, international equities and cash. The portfolio number, expected returns, standard deviations, and risk are illustrated in fields 902, 904, 906, and 908 respectively.

Figure 9B:
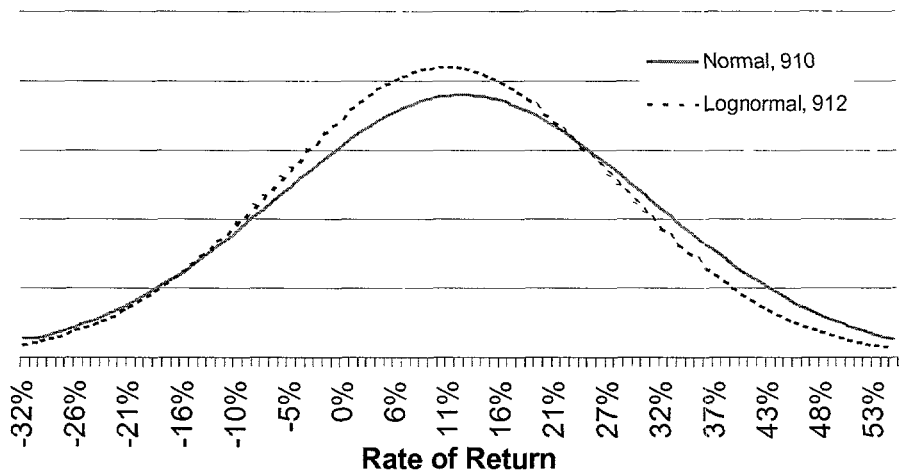

The expected returns in field 902 are arithmetically derived and are assumed normally distributed. The portfolios illustrated in FIG. 9A lie along the efficient frontier. For a single time period, the expected return is the arithmetic average. However, over multiple periods, the return is the geometric average. For example, if a portfolio returns 50% in year one and −50% in year two, the return is not the arithmetic average ((50%-50%)/2=0%); rather, the actual return is derived geometrically, ((1+50%)×(1-50%)−1=−25%). The geometric mean return is always less than the arithmetic mean, unless the returns are identical for each period making the geometric mean equal to the arithmetic mean. The geometric return is mathematically described by the lognormal function. FIG. 9B depicts the normal and lognormal distributions for portfolio number seven, which has an expected return of 11.70% and a standard deviation of 18.60%. The geometric mean return for portfolio seven is 10.18%. The normal distribution is illustrated by curve 910 while the lognormal distribution is illustrated by curve 912.

The lifetime wealth forecast chart depicted in area 430 of FIG. 4, illustrates the projected wealth accumulation pre-retirement and the wealth depletion post-retirement, based on the mean geometric return and the lognormal distribution of FIG. 9B, as described above. In one embodiment, it is also possible to toggle the lifetime wealth forecast graph between strong and weak market performance scenarios.

Figure 9C:
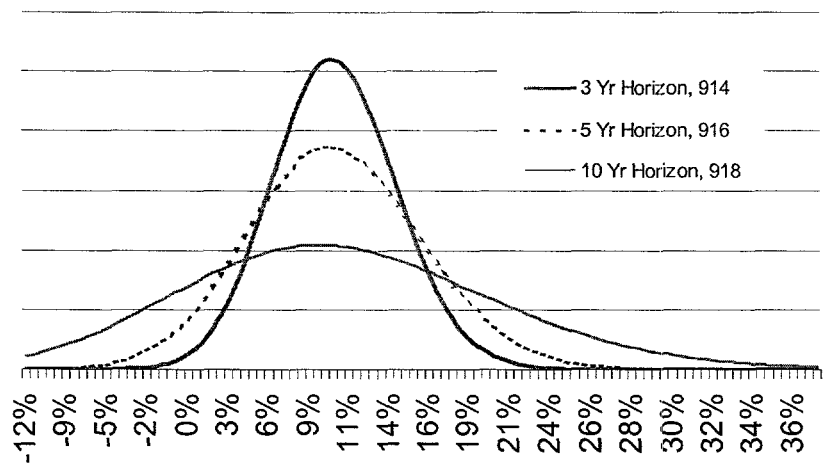

The time horizon is an important factor used to generate the lognormal distribution and therefore the probabilistic forecast that a user will meet a retirement goal. FIG. 9C depicts the lognormal distribution of portfolio seven over three, five and twenty year time horizons by curves 914, 916, and 918, respectively. As depicted in FIG. 9C, the mean for the various time horizons remains the same (10.18%); however, the longer the time horizon, the smaller the standard deviation. Although the distribution of potential returns narrows over time, the range of potential outcomes expressed in terms of wealth actually gets wider. This occurs because of the impact of compounding over time.

Determining the time horizon is straightforward when the assets are included in the equation over a fixed time period. However, this is rarely the case, as individuals save over time, and they spend the assets over time, especially for a retirement goal. Therefore, the multiple cash flows make the time horizon more difficult to calculate. Saving over time, in effect, shortens the overall time horizon as subsequent savings amounts have a shorter time horizon. Spending assets during retirement also has the effect of shortening the time horizon, which otherwise extends to the life expectancy. The time horizon can be determined by adding together the separately calculated time horizons for the period of cash inflows (pre-retirement savings period) and the period of cash outflows (post-retirement spending period).

A model for determining time weighted horizon of a series of cash flows is comparable to determining the duration of a fixed income security (e.g. bonds). Bonds generally pay coupon amounts on a semi-annual basis and principle at the end of the term. The value of the bond is equal to the present value of the cash inflows. As interest rates rise or fall, the value of the bond changes accordingly. The volatility of this price fluctuation depends on the duration of the bond, which depends on the term of the bond and the size of the coupon payment. The formula describing duration was first created by Frederick Macaulay in 1938, which is the weighted average term-to-maturity of the security's cash flows:

$$\text{Macaulay Bond Duration} = \sum_{t=1}^{n} \frac{t \times PVCF_t}{k \times PVTCF} \quad \text{(EQ \#5)}$$

where,
k is the number of payments per year;
n is the number of periods until maturity;
t is the period in which the cash flow is expected to be received;
$PVCF_t$ is the present value of the cash flow in period t discounted at yield-to-maturity; and
PVTCF is the total present value of the cash flow.

The higher the calculated duration of a bond, the greater the volatility with respect to a change in interest rates. Macaulay's formula was subsequently modified to give a more accurate representation of a bond's duration, so-called "modified duration":

$$\text{Modified Duration} = \frac{\text{Macaulay} \cdot \text{Duration}}{1 + (\text{Yield}/k)} \quad \text{(EQ \#6)}$$

where, Yield is equal to the internal rate of return used to calculate the present value of the cash flows.

Similar to using duration to determine the volatility of a bond when interest rates shift, the time horizon determines the forecasted volatility of a portfolio. The longer the time horizon, the less the forecasted volatility. The time horizon of the cash inflows and cash outflows are calculated by the investment guidance system 100 using the modified duration formula to calculate the time weighted horizon. Modified duration is used to calculate the duration of cash inflows, so the formula is modified to measure the duration of cash outflows by multiplying Macaulay's formula by (1+Yield/k) rather than dividing:

$$\text{Time Weighted Horizon (Outflows)} = \sum_{t=1}^{n} \frac{t \times PVCF_t}{k \times PVTCF} \times (1 + \text{Yield}/k) \quad \text{(EQ \#7)}$$

$$\text{Time Weighted Horizon (Inflows)} = \sum_{t=1}^{n} \frac{t \times PVCF_t}{k \times PVTCF} \div (1 + \text{Yield}/k) \quad \text{(EQ \#8)}$$

where,
k is the number of cash flows per year;
n is the number of periods;
t is the period in which the cash flow is expected to be received;
$PVCF_t$ is the present value of the cash flow in period t discounted at yield-to-maturity;
PVTCF is the total present value of the cash flow; and
Yield is equal to the internal rate of return used to calculate the present value of the cash flows.

The total time horizon is the sum of the time weighted horizons. The time horizon and the required rate of return are then used to calculate the Z-score by the following equation:

$$Z = \frac{(\ln(1+R) - m \times \sqrt{n})}{s} \quad \text{(EQ \#9)}$$

where:
R is the required rate of return;
m is the expected value
n is the total time horizon; and
s is the standard deviation of the natural logarithm of the portfolio's expected return.

The z-score is then used to calculate the probability of meeting the retirement goal. Z-scores and their corresponding percentages can be obtained from a table of cumulative values of the standard normal distribution or from software that produces such values.

The calculations performed by the retirement goal forecaster 320 in determining a user's probability of meeting their retirement goal is illustrated in the following example:

Assumptions: the user: (1) is currently 55, (2) plans to retire at 65, (3) has a life expectancy of 85, (4) has current savings of $100,000, (5) plans to save $10,000 per year for 10 years up until retirement at age 65, (6) invests in portfolio number seven (refer to FIG. 9A), (7) requires $20,000 per year, in today's dollars, during retirement and (8) expects an inflation rate of 3%.

Required Rate of Return: The rate of return required for this investor to meet his/her retirement goal is 6.39%, which becomes the discount rate used for purposes of calculating the present value of the cash flows and the Yield in the time weighted horizon formulas (Equations #7 and #8).

Time Weighted Horizon (Outflows): The first step is to determine the duration of the cash outflows, from retirement up until the life expectancy. Through applying Equation #7 to the future value of the cash outflows (after applying inflation to the retirement need), the duration, or time weighted horizon of these outflows is determined to be 7.04 years. The duration is less than half of the twenty years between retirement and death because the early cash outflows with the shortest time horizon are attributed the greatest, amount of weight, due to the present value being larger than later cash flows with longer time horizons.

Time Weighted Horizon (Inflows): The second step is to determine the duration of the cash inflows, from today up until retirement. Through applying Equation #8 to the cash flows (current savings and additional savings), the duration, or time weighted horizon, of these inflows is calculated to be 8.68 years. The duration is closer to the tens years between today and retirement because the early cash inflows with the longest time horizon are attributed the greatest amount of weight, due to the present value being larger than later cash flows with shorter time horizons. In addition, since the since the current savings ($100,000) is significantly larger than the future savings amounts ($10,000 per year), the current savings with the longest time horizon lengthens the time weighted horizon.

Probability of Meeting Retirement Goal: Therefore, the total time horizon is the sum of the time weighted horizons for the outflows and inflows, 7.04+8.68=15.73 years. This total time horizon and the required rate of return are used to calculate the Z-score by Equation #9. The z-score is then used to calculate the probability of meeting the retirement goal.

As indicated in the assumptions of the illustrative example, the user selects portfolio 7, which, as illustrated in FIG. 9A has an expected return of 11.70% and a standard deviation of 18.60%. Therefore, the expected value (m) is calculated by EQ. #1 to be 9.70%, and the standard deviation (s) of the natural logarithm of the portfolio's expected return is calculated by EQ. #2 to be 16.54%.

Therefore, through substituting in EQ. #9, 6.39% for R, 15.73 years for n and the calculated values 9.70% and 16.54% for m and s, respectively, Z is calculated to be –0.839057. The corresponding percentage equals 79.93%, which means that this investor has a 73.93% chance of meeting her retirement goal.

As previously discussed, the retirement goal forecaster 320 utilizes the methodology described in the illustrative example above, to determine the probability of meeting the retirement goal, for both the current and target asset allocations.

Mutual Fund Selector

The mutual fund selection screen 500 illustrated in FIG. 5 has three general objectives: (1) to allow users to evaluate investments; (2) to facilitate the selection of mutual funds by allowing the user to apply relative weights of importance to mutual fund criteria based on the user's personal investment preferences; and (3) to provide a vehicle wherein the user buys and sells investments in the appropriate quantities so that the current asset allocation meets the target asset allocation. According to one embodiment of the system illustrated in FIG. 5, the mutual fund selection screen includes eight separate areas: (1) an area 510 to display "coaching" messages to assist the user in evaluating and selecting investments to fulfill the target asset allocation; (2) an area 520 which summarizes the current versus the target allocation by depicting all of the accounts and categorizing the accounts according to asset class; (3) an area 580 to select a universe of assets to evaluate; (4) an area 530 which summarizes the target and current value of a selected asset class and also defines the amount of cash currently available in the user's portfolio; (5) an area 540 to select which account to evaluate; (6) an area 550 for filtering the available funds and evaluating mutual fund characteristics on a relative basis based on personal investment preferences; (7) an area 560 which organizes all graphical input mechanisms to affect operations related to implementing a target asset allocation; and (8) an area 570 which displays a table of ranked funds for a selected universe.

In one embodiment, area 510 displays "coaching" messages to assist the user in implementing a retirement plan. In most instances, the text will require the user to make a decision which determines the sequence of events that will follow. In a further embodiment, area 510 also displays "warning" messages during the execution of mutual fund trades. The warning messages may include special risks associated with a specific type of mutual fund (e.g. industry-specific or region-specific mutual funds) or information concerning the tax and transaction fee consequences in executing a trade for a selected mutual fund. In a further embodiment, the investment guidance system also flags taxable accounts for the purpose of assessing tax implications.

Area 520 illustrates the current versus target asset allocation for all of the accounts and categorizes the accounts according to asset class. The asset allocation includes all accounts that were considered in developing a retirement and investment plan. Accounts include but are not limited to 401 (k), IRA, Roth IRA and taxable accounts. The current allocation is shown as a solid bar, whose height is directly proportional to the asset's percentage of the user's portfolio. The solid bar consists of different shadings for each account. Furthermore, area 520 may also depict a legend to define which accounts correspond to which shadings. The target asset allocation is illustrated as a line with a target symbol. Once the user begins to execute mutual fund transactions within each asset class, the bars begin to change heights accordingly, allowing the user to visually determine if the target allocation has been met or is being exceeded by the mutual fund transactions. In one embodiment, the incremental changes in the bar heights due to the mutual fund transactions are shown in a lighter shade, thereby allowing the user to continuously compare the previous asset allocation with the new or "planning" portfolio's asset allocation. Once the user has executed all of his/her transactions and has finalized the new portfolio, the lighter shaded regions of the bar transform to normal hues.

Area 530 illustrates the target and current value of each asset class and the difference between the two, which indicates the amount of the assets to buy or sell in order to achieve the target asset allocation. In the embodiment depicted, the target and current values of the large cap asset class are $53,656.80 USD and $42,044.00 USD, respectively. Therefore, the user must purchase assets valued at $11,612.80 in order to fulfill the target asset allocation. Additionally, area 530 illustrates the available cash in the user's portfolio due to the liquidation of investments.

Area 580 allows the user to select the universe of funds he/she desires to evaluate. In the embodiment depicted, the asset class definitions include large cap, mid cap, small cap, international equity, and bonds. The asset class definitions may be defined by the partnering financial institution, a third party financial company, or by the user. The asset class definitions include, but are not limited to U.S. equities (or any sub-asset class thereof, such as large cap value, mid cap value, mid cap growth, small cap value, small cap growth), international equities (or any sub-asset class thereof, such as emerging market equities), fixed income (or any sub-asset class thereof, such as intermediate-term bonds or junk bonds), real estate, precious metals and cash. In one embodiment, the input mechanism for selecting a universe of funds is radio buttons as illustrated in area 580 of the sample mutual fund selector screen 500. Additional graphical input mechanisms for the selection of an asset class include but are not limited to pull down menus, check-box fields and text-entry fields. The user selects a universe of mutual funds to evaluate by clicking a radio button under one of the asset classes. For example, by clicking "large cap", the mutual fund selector will be populated with all large cap funds that are available in each of the accounts. In one embodiment, for the initial investment evaluation, the investment guidance system 100 may default to the asset class which is most overweighed; that is, the asset class with a current allocation weight greater than the target allocation weight, in order to allow the user to liquidate current assets prior to purchasing additional assets. The user can then proceed with executing transactions within the default asset class or choosing another asset class to begin evaluating.

In one embodiment of the system, area 560 is a predefined area of the display which groups together all of the graphical input mechanisms for executing actions related to the mutual fund selector. In a preferred embodiment, the graphical input mechanism are buttons, however; as apparent to those skilled in the art, any graphical input mechanism may be employed. Actions include, but are not limited to, review transactions, execute transactions, print report, and save without execution.

The review transactions input mechanism allows the user to view a report that summarizes all of the transactions which have been performed for planning purposes versus those that have been executed, including (a) the transaction type (buy/sell), (b) the number of shares, (c) the security name, (d) the total value of the transaction, (e) the taxable gain/loss (if applicable), and (f) any transactions fees. Any transactions that have not been executed can be "undone" or deleted by the user. However, any transactions that have been executed must be reversed in order to be undone; that is, the user must perform a separate transaction in reverse. In one embodiment of the system, the user performs transactions for planning purposes and can decide to execute the "planned" transactions at any point during the session, at the end of the session, or the user can save the planned transactions for execution at a later time.

The execute transactions input mechanism triggers the execution of any planned transactions. For accounts associated with the partnering financial institution, the transaction will occur automatically through the Internet. For accounts that are associated with third party financial institutions, the user will be able to print a report for separately executing these transactions using some type of communication device.

The print report input mechanism triggers the printing of the report which summarizes all of the transactions which have been performed for planning purposes versus those that have been executed. The save without execution input mechanism allows the user to save the transactions conducted during the current session for further planning during a separate session. If the user attempts to exit the investment guidance system without saving the transactions first, the system will prompt the user to save the transactions conducted thus far, or exit the application without saving any conducted transactions, thereby allowing everything to revert to the way it was before the session was started.

Area 550 allows the user to rank the importance of mutual fund criteria based on personal preferences through graphical input mechanisms. Additionally, area 550 provides input mechanisms which allow the user to filter out funds which do not meet certain minimum thresholds. The remaining funds are then ranked according to the user's personal investment preferences. The mutual fund sorting tool and its function will be described in greater detail in connection with FIG. 6.

Based upon the ranking of the mutual fund criteria, the investment guidance system 100 sorts the available mutual funds and displays the results in area 570, the fund rank table. The user's personal preferences are taken into account simultaneously to sort the universe of mutual funds without having to eliminate any funds from the evaluation process. The table defaults in displaying the funds ranked by the personal preference rating (highest to lowest). However, the user can manipulate the data in order to display the mutual funds ranked in terms of total returns or by one of the multiple financial statistical parameters. The user can then select which mutual funds to buy or sell from the fund rank table. The fund rank table will be described in greater detail in connection with FIG. 7.

Figure 6:
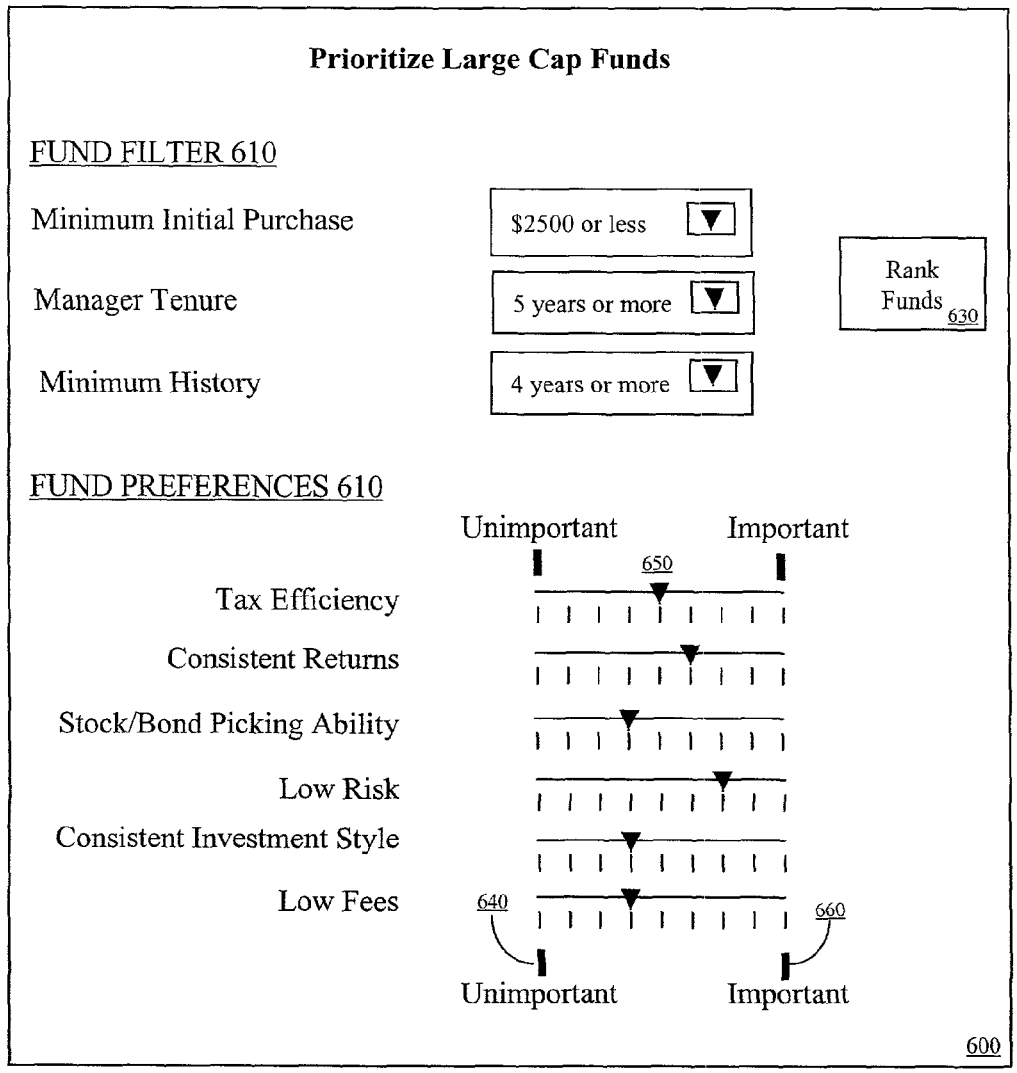
FIG. 6 depicts a screen used to specify mutual fund characteristics.

In one embodiment of the investment guidance system 100, the various criteria which are utilized for eliminating and ranking mutual funds and the graphical input mechanisms used to define and weight the criteria are illustrated in FIG. 6. Initially, the user filters the available universe of funds by establishing minimum criteria that the fund must satisfy. The various criteria, which are depicted in FIG. 6 in the three selectable pull-down windows, are used to set minimum thresholds. If a fund does not meet the minimum thresholds, it is eliminated from the universe of funds. The criteria used to filter and eliminate funds includes the minimum initial purchase, the manager tenure and minimum fund history. The user defines these minimum parameters based on the asset class he/she is evaluating and on his/her personal investment preferences. The minimum initial purchase is determined by the available cash in the user's portfolio. Thereafter, the user then proceeds in evaluating the mutual fund characteristics on a relative basis, as opposed to on an elimination basis.

Once the user is educated on each of the defined mutual fund characteristics, through a series of "coaching" messages, he/she ranks the importance of each characteristic based on personal preference. These preferences are taken into account simultaneously to sort the universe of mutual funds without having to eliminate any funds from the evaluation process. The graphical input mechanisms, illustrated in this embodiment as slider bars, are used to apply relative weights of importance to the mutual fund characteristics. The user assigns a relative weight of importance to the mutual fund criteria by selecting the appropriate slider bar and moving the slider 650 to various positions. According to the embodiment depicted, the mutual fund criteria include tax efficiency, consistent returns, stock/bond picking ability, low risk, consistent investment style and low fees. However, this list is not exhaustive and additional fund criteria may be specified. The user can apply relative weights to each of the mutual fund criteria by utilizing the slider bars which range from unimportant to important. The left end-point 640 represents "unimportant" mutual fund characteristics and the right end-point 660 represents an "important" mutual fund characteristics. The user indicates his/her preferences for each criterion, by positioning the slider 650 anywhere between the left end-point 640 and the right end-point 660. For example, if the user positions the slider 650 at the left end-point, the user has defined that the mutual fund criterion is unimportant, and the criterion is given a weight of zero.

Conversely, if the user positions the slider at the right-end point 660, the user has defined that the mutual fund criterion is important, and the criterion is given the maximum defined weight. Likewise, if the user positions the slider 650 in the middle, the user has defined that the mutual fund criterion should be assigned half of the defined maximum weight. The investment guidance system 100 then ranks the mutual funds based on the user's personal preferences. The various mutual fund criteria can be defined by the investment guidance system 100, by the partner financial provider or by the user him/herself.

The mutual fund selector utilizes financial statistics which are well known in the art, in order to evaluate the mutual fund criteria. Some of the statistics are components of the Modern Portfolio Theory (MPT), which is a standard financial and academic method for assessing the risk of mutual funds. The financial statistics include, but are not limited to, alpha, beta, R-squared, standard deviation, and the Sharpe ratio. However, since each financial statistic is unique and has a different range (e.g. R-squared ranges from 0 to 100, alpha can be positive or negative with no numerical limits), it is preferable to normalize the statistical data so that the diverse mutual fund criteria can be evaluated together. The statistical data is normalized by creating a distribution of the selected mutual fund universe and describing the statistical value based on its relative position in the distribution. The slider bars are multipliers, which allow the user to effectively assign a weight to each of the mutual fund criteria. Each mutual fund criterion is measured by one or more statistical values which are normalized so that different fund criteria can be evaluated simultaneously.

For example, the statistical parameter, R-squared, is used in measuring the consistent investment style of a fund. Therefore, if the user has assigned a weight of "10" to the mutual fund criteria, a consistent investment style, then the R-squared values for each mutual fund in the universe under evaluation will be multiplied by 10. R-squared is a modern portfolio statistic that measures the correlation of a funds returns with the funds benchmark index. Essentially, R-squared reflects the percentage of a fund's movement that can be explained by movements in the index. Thus, index funds that invest only in S&P 500 stocks will have an R-squared very close to 100. Conversely, a low R-squared value indicates that very few of the fund's movements can be explained by movements in its benchmark index. For example, an R-squared value of 35, indicates that only 35% of the fund's movements can be explained by movements in the benchmark index.

The statistical parameter, tax efficiency, which excludes additional gains, taxes, or tax losses incurred upon selling a fund, is derived by dividing after-tax returns by pretax returns. The highest possible score would be 100%, which would apply to a fund that had no taxable distributions, such as many municipal-bond funds. The tax efficiency for a fund is listed for three, five, ten and fifteen years and provides a contrast to tax-adjusted historical returns. While tax-adjusted historical returns measure the bottom-line aftertax results of a fund, without regard to pretax performance, tax efficiency measures whether the fund manager has kept an eye on tax consequences.

The statistical parameter, information ratio, is used in measuring the consistent returns of a fund. The information ratio measures the consistency with which a manager beats a benchmark index. The information ratio of a manager series versus a benchmark series is the quotient of the annualized excess return and the annualized standard deviation of excess return.

The criterion, stock/bond picking ability, is the excess returns above the style benchmark, as determined through a returns-based style analysis.

Furthermore, low risk, is volatility as measured by standard deviation. Standard deviation of return measures the average deviations of a return series from its means, and is often used as a measure of risk.

The criterion, low fees, refers to the mutual fund's expense ratio. The expense ratio is the percentage of fund assets paid for operating expenses and management fees, including 12b-1 fees, administrative fees, and all other asset-based costs incurred by the fund, except brokerage costs. Fund expenses are reflected in the fund's NAV. Sales charges are not included in the expense ratio.

In order to rate each mutual fund in the universe, the assigned weights are (a) multiplied by the mutual funds normalized criteria score and (b) added to each other. Therefore, the final score or rating for each mutual fund is the aggregate sum of each of the normalized mutual fund criteria scores multiplied by the respective weights. When the "rank funds" button 630 is clicked, the funds are ranked according to the final fund score, which simultaneously takes into account all of the user's preferences. The user then decides which funds to buy and sell in order to fulfill the target asset allocation plan.

FIGS. 7a and 7b illustrate two exemplary embodiments of the fund rank table described in connection with the mutual fund selector screen 500. The fund rank table includes fields for the fund's ticker symbol 704, its name 706, the possible type of trading transaction 708, and the fund rank 710 based on the user's personal investment preferences. By clicking on the fund's ticker symbol the system displays performance data for the selected fund including major fund holdings, Morningstar ratings, etc. The trading field 708 will show "sell" only if the user currently owns shares of the mutual fund in the asset class that is currently being evaluated. FIG. 7a, which illustrates the "Returns" tab 702 of the fund rank table, depicts the mutual funds' total returns 712 for 1, 3, 5 and 10 years. The investment guidance system 100 defaults to ranking the funds according to the user's personal preferences for each fund criteria. However, by clicking on the "year" field of the total returns 712, the investment guidance system 100 will rank the funds according to returns, from highest to lowest. FIG. 7b, which illustrates the "Risk" tab 703 of the fund rank table, depicts the calculated values for the statistical parameters used in evaluating the mutual fund criteria. In one embodiment of the system, the statistical parameters include standard deviation 713, Sharpe Ratio 715, alpha 717, and R-squared 718. By clicking on the title field of any of the statistical parameters, the investment guidance system 100 will rank the funds according to the selected statistical parameter from highest to lowest. Moreover, in order to select a fund to execute a transaction, the user highlights the fund by clicking on the fund name. The user will then be prompted to perform a mutual fund transaction by specifying the quantity of shares to be bought or sold. The investment guidance system 100 will then reallocate the assets based on the new transaction.

It should be noted that the functions described in conjunction with the mutual fund selector could be carried out in different portions of the sample screen or by additional components that are currently not illustrated.

Mutual Fund Selection Process

Figure 8:
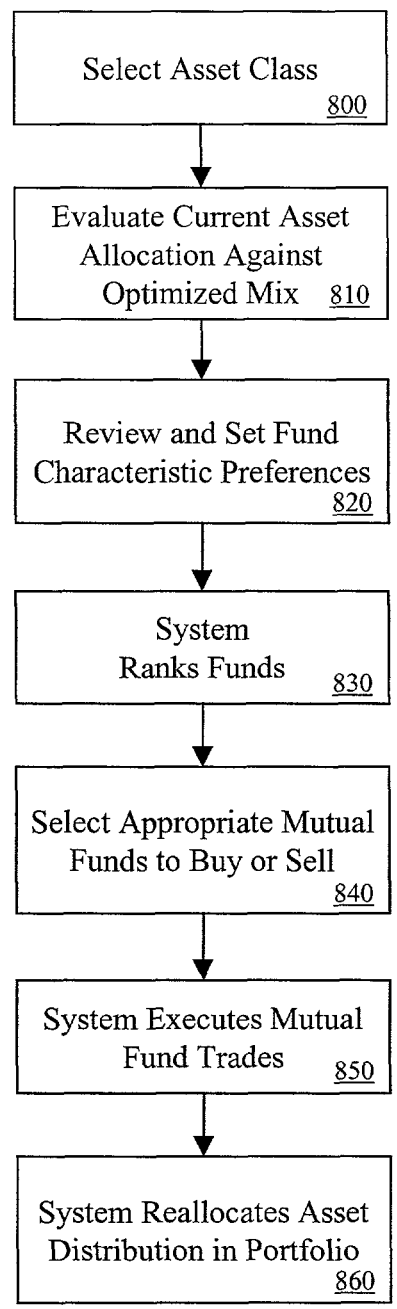
FIG. 8 is a flow diagram illustrating a process of selecting mutual funds for a target asset allocation based on personal investment preferences.

FIG. 8 is a flow diagram illustrating the mutual fund selection process according to one embodiment of the present invention. The mutual fund selector allows the user to evaluate investments and provides a vehicle wherein the user buys and sells investments to meet a target asset allocation. In the two stages of the evaluation process, the user (1) evaluates existing holdings in each asset class for the purpose of selling securities and (2) evaluates the available universe of mutual funds for each asset class for the purpose of making purchases. In step 800 the user selects an asset class to evaluate. In on embodiment, the investment guidance system may default to the asset class which is most overweighed; that is, the asset class with an allocation greater than the target allocation, in order to allow the user to liquidate current assets before purchasing additional assets. For example, based on the embodiment set forth in area 520 of FIG. 5, the system would have defaulted to the international equity asset class because it is the most overweighed.

Once the user has selected an asset class to evaluate, the fund selector is populated with the universe of mutual funds of the selected asset class that are available through each of the accounts. The mutual fund selector allows the user to simultaneously evaluate the mutual funds available in all of the accounts for a given asset class. For example, in the embodiment depicted in FIG. 5, the large cap asset class is selected for evaluation. Therefore, the fund selector will be populated with all large cap funds that are available within the account specified in area 540 of FIG. 5. The default account type in area 540 is "all accounts", whereby the fund selector will be populated with all of the mutual funds available in all of the accounts for a selected asset class. However, the user can choose to evaluate the funds in a selected account for the purpose of planning or executing transactions within a certain account.

In step 810, the user evaluates the current asset allocation against the target asset allocation to determine if the asset class is overweighed or underweighed; that is, if the current asset allocation is greater than the target allocation or if the current asset allocation is less than the target allocation, respectively. If it is the initial or one of the initial evaluations, then the evaluation is usually based on asset classes that need to be reduced in order to meet the target asset allocation. In one embodiment, the investment guidance system may prompt a user to sell a fund within an asset class before prompting the individual to purchase a mutual fund in the selected asset class. In one embodiment, the user may prefer evaluating the current investments in order to sell those holdings which do not meet the users personal investment preferences.

In step 820, the user reviews and sets fund criteria based on personal preferences. The user evaluates the mutual fund criteria by deciding which criteria are important to the investor in meeting his/her investment goals. Initially, the user will set minimum thresholds to filter out the universe of funds. The user will then proceed to position the slider and assign relative weights of importance to the mutual fund criteria. Once the user sets the minimum thresholds and the relative weights, the system automatically saves them, and they are subsequently associated with each of the remaining asset classes. However, if in evaluating the remaining asset classes, the user then decides to alter the relative weight assignment of one or more of the mutual fund criteria, then the investment guidance system will prompt the user if he/she wishes to modify the relative weight assignment(s) for the selected asset class only or if he/she would like to change the relative weight assignment(s) globally (i.e. across all asset classes). Once the user has ranked the importance of each characteristic based on personal preference, the system sorts the universe of mutual funds by simultaneously taking into account all of the specified preferences in step 830. This "single" sort process does not eliminate any funds from the evaluation process and the user can view the rankings of all of the funds available in the mutual fund universe.

The mutual fund selector process is extremely interactive and allows the user to test the sensitivity of the weighted mutual fund criteria and immediately see the results. In positioning the slider bar from unimportant to important, the user applies relative weights of importance to each of the mutual fund criteria. In one embodiment, the weights vary from ZERO at the left end point of the slider, which indicates that the criteria is unimportant, to TEN, at the right end point of the slider which indicates that the criteria is very important to the investor in meeting his/her investment goal. The slider bars are multipliers which allow the user to choose the weight to assign to each of the mutual fund criteria. Each mutual fund criterion is measured by one or more statistical values which are normalized so that different fund criteria can be evaluated simultaneously. In step 830, the system ranks the mutual funds by multiplying the assigned weight by the criterion's normalized statistical score and adding them to each other. Therefore, the final rating for each mutual fund is the aggregate sum of the normalized statistical scores multiplied by each of the respective weights. The system then proceeds to rank the mutual funds according to the final rating and display the ranked funds in the fund rank table.

The user then proceeds to select which mutual funds to buy and sell in order to fulfill the target asset allocation 840. In one embodiment, the user is initially prompted to sell funds which do not meet the mutual fund preferences. The transaction window can be accessed by clicking on the name of any of the mutual funds listed in the fund rank table. If the fund is an existing holding in the asset class currently being evaluated, the transaction field in the fund rank table displays both the buy and sell options. After the transaction window is activated, the user will be asked to specify the quantity of shares to sell or purchase and the respective account wherein to execute the transaction. If the user is evaluating an asset class that is overweighed, the system will automatically determine the number of shares of a selected fund that need to be sold in order to meet the asset allocation. Similarly, if the user is evaluating an asset class that is underweighed, the system will automatically determine the number of shares of a selected fund that need to be bought in order to meet the asset allocation. The system will also screen and eliminate the funds for which the user does not meet the minimum initial purchase.

As the user performs various transactions, the assets are redistributed based on the revised portfolio and graphically depicted in field 520 of FIG. 5. Since the transaction is not actually executed, the changes in the heights of the bars in the graph of field 520 of FIG. 5 are a lighter color than the existing hue, enabling the user to visually determine if the target asset allocation is being met. In one embodiment of the system, the user performs transactions for planning purposes and can decide to execute the transaction at any point during the session, at the end of the session, or the user can save the planned transactions for execution at a later time. In step 850, the user decides to implement the planned transactions and the system executes the mutual fund trades. For accounts associated with the partnering financial institution, the transaction will occur automatically through the Internet. For accounts that are associated with other third party financial institutions, the user will be able to print a report for separately executing these transactions using some type of communication device. In step 860, the system reallocates and finalizes the asset distribution in the portfolio based on the executed transactions, and graphically depicts the current asset allocation for each asset class.

The user performs the steps outlined in FIG. 8 for each asset class selected for evaluation. Furthermore, the user can continuously fine-tune and rebalance his/her portfolio based on modifications in the user's retirement age, savings amount, retirement income need, target asset allocation and investment preferences. Additionally, the investment guidance system monitors and alerts users on the status of their target retirement investment plan. The alerts, as previously discussed, communicate to the user insufficient progress toward reaching financial goals, change in the status of a mutual fund and significant market events. Based on the alerts, the user will evaluate and adjust investments to maintain the target investment plan.

While the embodiments of the present invention have been described with reference to a financial guidance system and more specifically to a method and system for evaluating mutual funds based on personal investment preferences, the method and apparatus described herein are equally applicable to the evaluation and ranking of other types of data based on personal preferences. Data the user could evaluate by assigning a relative weight of importance to various criteria based on personal preferences includes but is not limited to assets, wine, vacation spots, airline carriers, hotel chains, and diamonds. For example, a user could sort various bottles of wines based on evaluating and assigning a relative weight of importance to various criteria associated with wines such as full-bodied, depth, tannin level, barrel fermented and estate-bottled. Additionally, a user could sort a selected universe of vacation spots by assigning a relative weight of importance to various criteria associated with vacation spots, such as consistent weather, diverse night-life, aquatic activities and activities for children. Furthermore, a user could sort various airline carriers by evaluating criteria such as safety record, frequency of cancelled flights, arrival and departure punctuality, and increased leg room. As described herein, the user reviews and sets a relative weight of importance for each data criteria based on personal preferences. For example, the user evaluates the various wine criteria by deciding which criteria are important to the user in meeting his/her drinking preferences. The system then sorts the data taking into account all of the weighted criteria and presents the user with a list of ranked data.

It is to be understood that the embodiments and variations shown and described herein are merely illustrative of the principles of the present invention. Therefore, various adaptations and modifications may be implemented by those skilled in the art without departing from the spirit and scope of the present invention. The specification and drawings are, accordingly, to be regarded in an illustrative rather than a restrictive sense.

The invention claimed is:

1. An investment guidance system for providing financial planning assistance, comprising:
   means for receiving a financial goal from a user;
   means for receiving one or more input decisions upon which the probability of achieving said financial goal is dependent, wherein one of the input decisions includes selecting an asset allocation based on investment risk;
   means for determining the probability of achieving said financial goal;
   means for receiving an indication that said user has selected a target asset allocation investment plan in order to achieve said financial goal;
   means for receiving a request to rate a plurality of assets within a selected asset class;
   means for providing two or more criteria associated with said assets for said user to evaluate;
   means for determining a normalized value for each of said two or more criteria;
   means for receiving a relative weight of importance for said two or more criteria based on the user's personal investment preferences;
   means for determining a rating for each asset based on the normalized values and the relative weights assigned to said two or more criteria;
   means for ranking plurality of said assets based on said rating;
   means for receiving a request to execute a trade for one or more of the ranked assets in order to fulfill said target asset allocation investment plan; and
   means for executing said trade for one or more of the selected ranked assets.

2. The system of claim 1, further comprising means for reallocating asset distribution in a user's portfolio based on executed trades.

3. The system of claim 1, further comprising means for receiving additional requests to execute said trade for one of the ranked assets in order to fulfill said target asset allocation investment plan.

4. The system of claim 1, further comprising:
   means for evaluating said target asset allocation investment plan against one or more financial goals;
   means for alerting the user if progress towards one or more financial goals deviates substantially.

5. The system of claim 1, wherein said financial goal is a retirement income.

6. The system of claim 1, wherein one of said input decisions upon which the probability of achieving said financial goal is dependent is a 401(k) contribution rate.

7. The system of claim 1, wherein one of said input decisions upon which the probability of achieving said financial goal is dependent is a taxable savings rate.

8. The system of claim 1, wherein one of said input decisions upon which the probability of achieving said financial goal is dependent is the income required at retirement.

9. The system of claim 1, wherein one of said input decisions upon which the probability of achieving said financial goal is dependent is an anticipated retirement age.

10. The system of claim 1 wherein the means for determining the normalized value for each of said two or more criteria comprise:
    means for creating a distribution of the assets; and
    means for computing, for each of said two or more criteria of each of the assets in the distribution, normalized values of said two or more criteria based on the relative position of the respective asset in the distribution.

11. The system of claim 1 wherein the means for determining the rating for each asset based on the normalized values comprises:
    means for multiplying each of the normalized values associated with each of the assets by the respective relative weight of importance; and
    means for summing the normalized values associated with each of the assets multiplied by the respective weights to obtain the respective rating for each of the assets, the respective rating being an aggregate sum corresponding to the respective asset's associated values multiplied by the associated values' respective weights.

12. The system of claim 1 wherein the means for means for ranking plurality of said assets based on said rating comprises:
   means for ranking the assets based on the aggregate sum for each of the assets.

13. the system of claim 1 wherein the two or more criteria comprises one or more of: an R-squared value representative of a correlation between the value of an asset and the behavior of one more benchmark indices, a tax efficiency value computed as an after-tax returns for the asset divided by the pre-tax returns, an information ratio representative of the consistency with which a manager managing the assets generally beats the one or more benchmark indices, a risk factor associated with the asset, administrative fees associated with the asset and standard deviation associated with the asset.

* * * * *